(12) United States Patent
Feezor et al.

(10) Patent No.: US 10,810,664 B2
(45) Date of Patent: Oct. 20, 2020

(54) ITEM PROCESSING EXCEPTION CONFIGURABLE PIPELINE

(71) Applicant: Bank of America Corporation, Charlotte, NC (US)

(72) Inventors: David Jacob Feezor, Charlotte, NC (US); Stuart Cameron Jones, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 128 days.

(21) Appl. No.: 15/627,659

(22) Filed: Jun. 20, 2017

(65) Prior Publication Data

US 2018/0365018 A1 Dec. 20, 2018

(51) Int. Cl.
*G06Q 40/02* (2012.01)
*G06Q 20/40* (2012.01)

(52) U.S. Cl.
CPC .......... *G06Q 40/02* (2013.01); *G06Q 20/401* (2013.01)

(58) Field of Classification Search
None
See application file for complete search history.

(56) References Cited

U.S. PATENT DOCUMENTS

| | | |
|---|---|---|
| 5,691,524 A | 11/1997 | Josphenson et al. |
| 6,301,379 B1 | 10/2001 | Thompson et al. |
| 7,181,430 B1 | 2/2007 | Buchanan et al. |
| 7,216,106 B1 | 5/2007 | Buchanan et al. |
| 7,304,996 B1 * | 12/2007 | Swenson ............ H04L 45/7453 370/229 |
| 7,974,922 B1 | 7/2011 | Hecht, Jr. et al. |

(Continued)

FOREIGN PATENT DOCUMENTS

| | | |
|---|---|---|
| EP | 671696 A1 | 9/1995 |
| WO | 0184436 A2 | 11/2001 |

(Continued)

OTHER PUBLICATIONS

Examination Report for European Patent Application No. 07842687.1 dated Jan. 25, 2012.

(Continued)

*Primary Examiner* — William B Partridge
(74) *Attorney, Agent, or Firm* — Michael A. Springs; Moore & Van Allen PLLC; Peter B. Stewart (57) ABSTRACT

A system for resolving item-processing exceptions typically includes a processor, a memory, and an exception resolution module stored in the memory. The exception resolution module is typically configured for: receiving an item-processing exception; determining a source of the item-processing exception; based on the source of the item-processing exception, identifying a defined exception resolution process; based on the defined exception resolution process, creating and configuring a pipeline context for resolving the item-processing exception, the pipeline context including the defined exception resolution process; storing the pipeline context in a pipeline database; adding the pipeline context to a pipeline queue; selecting, via a pipeline manager service, the pipeline context from the pipeline queue; and executing, via a worker thread, the pipeline context by executing the defined exception resolution process.

15 Claims, 3 Drawing Sheets

(56) References Cited

U.S. PATENT DOCUMENTS

| | | | |
|---|---|---|---|
| 8,126,808 B2 | 2/2012 | Reid et al. | |
| 8,135,894 B1 * | 3/2012 | Ball | G06F 13/26 |
| | | | 710/264 |
| 8,249,396 B2 | 8/2012 | Axtell et al. | |
| 8,725,607 B2 | 5/2014 | Dunn et al. | |
| 2002/0165007 A1 | 11/2002 | Gawne | |
| 2003/0009492 A1 | 1/2003 | Gawne | |
| 2004/0117280 A1 | 6/2004 | Klee et al. | |
| 2005/0071283 A1 | 3/2005 | Randle et al. | |
| 2005/0097019 A1 | 5/2005 | Jacobs | |
| 2005/0160039 A1 | 7/2005 | Garner et al. | |
| 2005/0171899 A1 * | 8/2005 | Dunn | G06Q 20/02 |
| | | | 705/39 |
| 2006/0106717 A1 | 5/2006 | Randle et al. | |
| 2009/0283004 A1 | 11/2009 | Teowee et al. | |
| 2010/0262814 A1 * | 10/2010 | Pardoe | G06F 9/3861 |
| | | | 712/244 |
| 2015/0169388 A1 * | 6/2015 | Hildebrandt | G06F 9/542 |
| | | | 719/318 |

FOREIGN PATENT DOCUMENTS

| | | |
|---|---|---|
| WO | 03060797 A1 | 7/2003 |
| WO | 2005066880 A1 | 7/2005 |

OTHER PUBLICATIONS

Extended European Search Report dated Jan. 21, 2011 for European Patent Application No. EP 07842687.1.

Bank of America Corporation, PCT International Preliminary Report on Patentability, issued in corresponding International Patent Application No. PCT/US2007/078766, dated Apr. 2, 2009.

Bank of America Corporation, PCT International Search Report, issued in corresponding International Patent Application No. PCT/US07/78766, dated Oct. 1, 2008.

Bank of America Corporation, PCT International Written Opinion, issued in corresponding International Patent Application No. PCT/US2007/078766, dated Oct. 1, 2008.

* cited by examiner

ITEM PROCESSING EXCEPTION CONFIGURABLE PIPELINE

FIELD OF THE INVENTION

The present invention embraces a system for resolving item-processing exceptions that is typically configured for: receiving an item-processing exception; determining a source of the item-processing exception; based on the source of the item-processing exception, identifying a defined exception resolution process; based on the defined exception resolution process, creating and configuring a pipeline context for resolving the item-processing exception, the pipeline context including the defined exception resolution process; storing the pipeline context in a pipeline database; adding the pipeline context to a pipeline queue; selecting, via a pipeline manager service, the pipeline context from the pipeline queue; and executing, via a worker thread, the pipeline context by executing the defined exception resolution process.

BACKGROUND

During the processing of items, an item processing system may identify a problem or abnormality in processing items. As a result of identifying a problem or abnormality, the item processing system will typically generate an item-processing exception. Accordingly, a need exists for an improved way of resolving item-processing exceptions.

SUMMARY

In one aspect, the present invention embraces a computerized system, and an associated method and computer program product, for resolving item-processing exceptions. The system typically includes a processor and a memory. The system also typically includes an exception resolution module stored in the memory and executable by the processor. In one embodiment, the exception resolution module is configured for: receiving an item-processing exception; determining a source of the item-processing exception; based on the source of the item-processing exception, identifying a defined exception resolution process; based on the defined exception resolution process, creating and configuring a pipeline context for resolving the item-processing exception, the pipeline context including the defined exception resolution process; storing the pipeline context in a pipeline database; adding the pipeline context to a pipeline queue; selecting, via a pipeline manager service, the pipeline context from the pipeline queue; and executing, via a worker thread, the pipeline context by executing the defined exception resolution process.

In a first particular embodiment, the exception resolution module is further configured for determining a type of the item-processing exception, wherein the defined exception resolution process is identified based also on the type of the item-processing exception.

In a second particular embodiment, either alone or in combination with the other particular embodiments, creating the pipeline context includes encapsulating within the pipeline context (i) steps of the defined exception resolution process and (ii) data contained in the item-processing exception.

In a third particular embodiment, either alone or in combination with the other particular embodiments, creating the pipeline context includes encapsulating within the pipeline context (i) steps of the defined exception resolution process and (ii) data contained in the item-processing exception.

In a fourth particular embodiment, either alone or in combination with the other particular embodiments, executing the pipeline context includes collecting data related to the item-processing exception and encapsulating the collected data in the pipeline context.

In a fifth particular embodiment, either alone or in combination with the other particular embodiments, the exception resolution module is further configured for: during execution of the pipeline context, determining, via the worker thread, that a step of the defined exception resolution process has not been completed; and in response to determining that the step has not been completed, re-queuing the pipeline context by adding the pipeline context to the pipeline queue.

In a first aspect of the fifth particular embodiment, the exception resolution module is further configured for: after re-queuing the pipeline context, re-selecting, via the pipeline manager service, the pipeline context from the pipeline queue; and executing, via a second worker thread, the pipeline context by: (i) determining that the step has been successfully completed, and (ii), in response to determining that the step has been successfully completed, executing a next step of the defined exception resolution process.

In a sixth particular embodiment, either alone or in combination with the other particular embodiments, the exception resolution module is further configured for: during execution of the pipeline context, determining, via the worker thread, that a step of the defined exception resolution process is waiting on a response from an external resource; in response to determining that the step is waiting on the response from the external resource, stopping execution of the pipeline context; receiving the response from the external resource; and in response to receiving the response from the external resource, (i) re-queuing the pipeline context by adding the pipeline context to the pipeline queue or (ii) resuming execution of the pipeline context by the worker thread.

In a seventh particular embodiment, either alone or in combination with the other particular embodiments, the item-processing exception is an image processing exception.

In an eighth particular embodiment, either alone or in combination with the other particular embodiments, the image processing exception is a check-image-processing exception.

In a ninth particular embodiment, either alone or in combination with the other particular embodiments, the exception resolution module is further configured for selecting the worker thread from a thread pool that includes a plurality of worker threads.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

An "entity" may be any person or organization implementing a system for resolving item-processing exceptions described herein. The entity may be any institution, group, association, financial institution, establishment, company, union, authority or the like. A "user" may be any person or entity using a system for resolving item-processing exceptions described herein. Often, a user is an employee of the entity.

An "item" may be anything being processed by an item processing system. In some embodiments, an item may be a physical item, such as a check. In other embodiments, an item may be an image of a physical item, such as an image of a check. In some embodiments, an item is or relates to a resource transfer. As used herein, a "resource transfer" or "transaction", may refer to any activities or communication between a customer (e.g., either an individual person or an organization) of an entity and the entity, activities or communication between multiple entities/customers, communication between technology applications and the like. A resource transfer may refer to a payment, processing of funds, processing of a check, purchase of goods or services, a return of goods or services, a payment transaction, a credit transaction, or other interactions involving a customer's resource or account. In the context of a financial institution or a resource entity such as a merchant, a resource transfer may refer to one or more of: a sale of goods and/or services, initiating an automated teller machine (ATM) or online banking session, an account balance inquiry, a rewards transfer, an account money transfer or withdrawal, opening a bank application on a customer's computer or mobile device, a customer accessing their e-wallet, or any other interaction involving the customer and/or the customer's device that invokes or is detectable by the financial institution. A resource transfer may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like. Unless specifically limited by the context, a "resource transfer" a "transaction", "transaction event" or "point of transaction event" refers to any activity initiated between a customer and a resource entity such as a merchant, between the customer and the financial instruction, or any combination thereof. In some embodiments, a resource transfer or transaction may refer to financial transactions involving direct or indirect movement of funds through traditional paper transaction processing systems (e.g., paper check processing) or through electronic transaction processing systems. In this regard, resource transfers or transactions may refer to the customer initiating a purchase for a product, service, or the like from a merchant. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated it could mean that the transaction has already occurred, is in the process of occurring or being processed, or it has yet to be processed/posted by one or more financial institutions. In some embodiments, a resource transfer or transaction may refer to non-financial activities of the customer. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures, and the like.

In the instances where the entity is a financial institution, a customer may be an individual or organization with one or more relationships affiliations or accounts with the entity. An "account" may be the relationship that the customer has with the entity. Examples of accounts include a deposit account, such as a transactional account (e.g. a banking account), a savings account, an investment account, a money market account, a time deposit, a demand deposit, a pre-paid account, a credit account, a non-monetary customer profile that includes only personal information associated with the customer, or the like. An account may be associated with and/or maintained by an entity.

An "item processing system" may be any system that processes items. For example, an item processing system may be a resource transfer processing system. In a particular example, an item processing system may be a check processing system that processes physical checks and/or images of physical checks. In some instances, an item processing system may be operated by the entity. In other instances, an item processing system may be operated by a third party (e.g., a third party organization). In typical embodiments, the entity operates one or more of its own item processing systems and is also in communication with item processing systems operated by third parties.

As noted, during the processing of items, an item processing system may identify a problem or abnormality in processing items. As a result of identifying a problem or abnormality, the item processing system will typically generate an item-processing exception. Such item-processing exception typically needs to be resolved in order to complete processing of the item.

Therefore, in one aspect, the present invention is directed to an improved system for resolving item-processing exceptions. In particular, the system typically receives an item-processing exception. Next, the system identifies characteristics of the item-processing exception, such as the source of the exception (e.g., the particular item processing system that generated the exception) and/or the type of exception. Thereafter, the system typically creates a pipeline context and configures the pipeline context based on the characteristics of the item-processing exception. The pipeline context is added to a queue and is then executed based on its particular configuration. Once execution of the pipeline context has been successfully completed, the item-processing exception may be marked as resolved.

Figure 1:
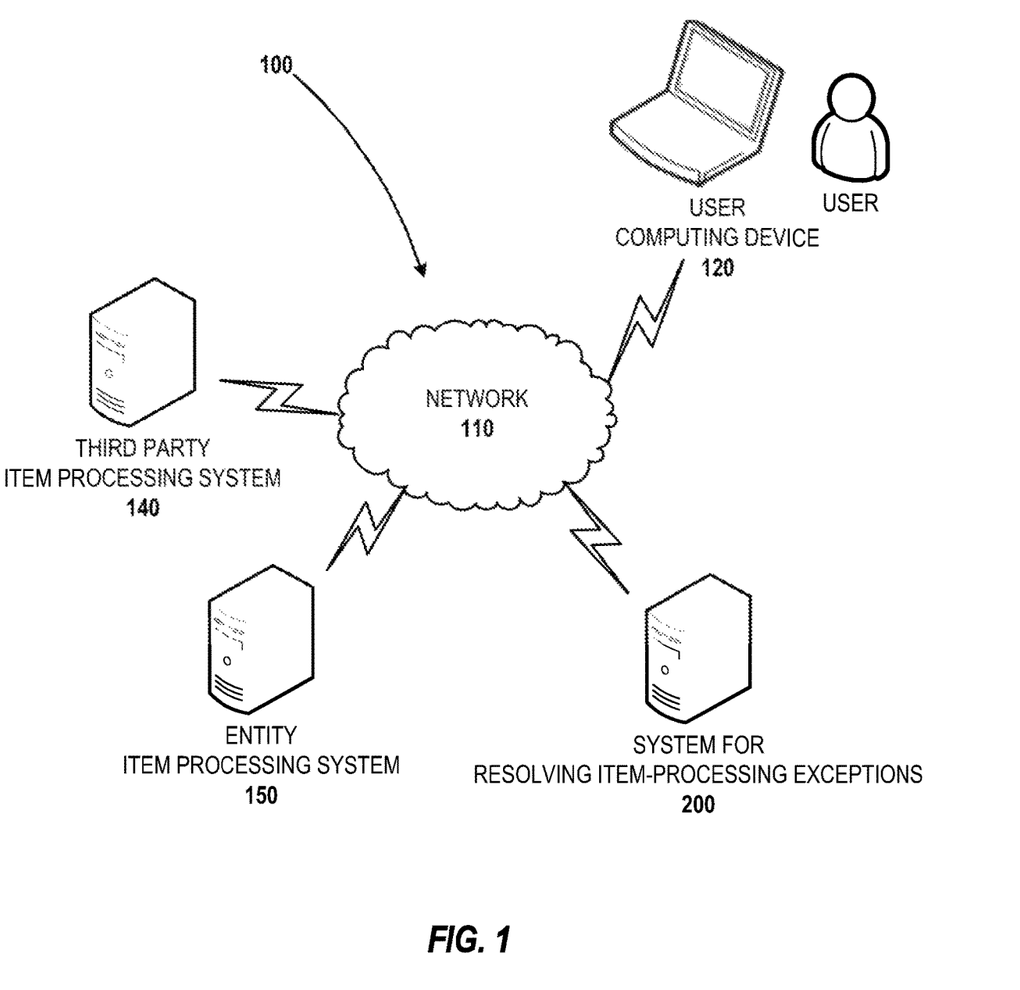
FIG. 1 depicts an operating environment in accordance with an aspect of the present invention.

FIG. 1 provides a block diagram illustrating an operating environment 100, in accordance with an embodiment of the present invention. As illustrated in FIG. 1, the operating environment 100 typically includes one or more item processing systems. One or more of the item processing systems may be operated by the entity, and one or more of the item processing systems may be operated by one or more third parties. By way of example, FIG. 1 depicts a third party item processing system 140 and an entity item processing system 150.

The operating environment 100 also typically includes a system 200 for resolving item-processing exceptions. The system 200 and the one or more item processing systems (e.g., the third party item processing system 140 and the entity item processing system 150) are typically in communication with a network 110, such as the Internet, wide area network, local area network, Bluetooth network, near field network, or any other form of contact or contactless network. One or more users, each having a user computing device 120, such as a PC, laptop, mobile phone, tablet, television, mobile device, or the like, may be in communication with the item processing systems and the system 200 via the network 110.

Figure 2:
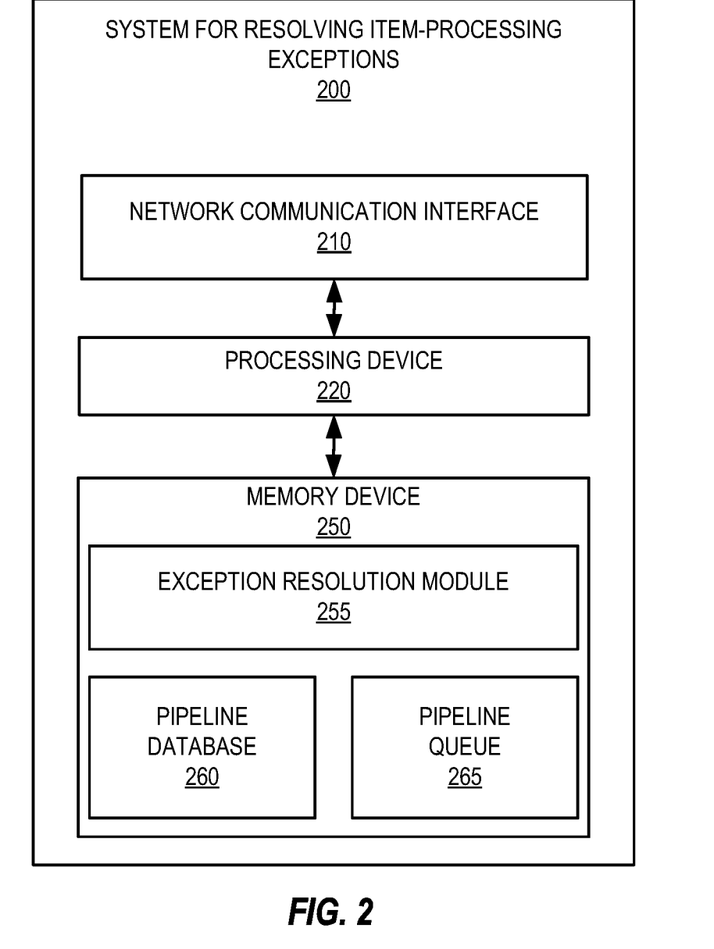
FIG. 2 schematically depicts a system for resolving item-processing exceptions in accordance with an aspect of the present invention.

FIG. 2 depicts the system 200 for resolving item-processing exceptions in more detail. As depicted in FIG. 2, the system 200 typically includes various features such as a network communication interface 210, a processing device 220, and a memory device 250. The network communication interface 210 includes a device that allows the system 200 to communicate with the item processing systems (e.g., the third party item processing system 140 and the entity item processing system 150) and user computing devices 120 (e.g., over the network 110 (shown in FIG. 1)).

As used herein, a "processing device," such as the processing device 220, generally refers to a device or combination of devices having circuitry used for implementing the communication and/or logic functions of a particular system. For example, a processing device 220 may include a digital signal processor device, a microprocessor device, and various analog-to-digital converters, digital-to-analog converters, and other support circuits and/or combinations of the foregoing. Control and signal processing functions of the system are allocated between these processing devices (e.g., processors) according to their respective capabilities. The processing device 220 may further include functionality to operate one or more software programs based on computer-executable program code thereof, which may be stored in a memory. As the phrase is used herein, a processing device 220 may be "configured to" perform a certain function in a variety of ways, including, for example, by having one or more general-purpose circuits perform the function by executing particular computer-executable program code embodied in computer-readable medium, and/or by having one or more application-specific circuits perform the function.

As used herein, a "memory device," such as the memory device 250, generally refers to a device or combination of devices that store one or more forms of computer-readable media for storing data and/or computer-executable program code/instructions. Computer-readable media is defined in greater detail below. For example, in one embodiment, the memory device 250 includes any computer memory that provides an actual or virtual space to temporarily or permanently store data and/or commands provided to the processing device 220 when it carries out its functions described herein.

As noted, the system 200 is configured to resolve item-processing exceptions. Accordingly, the system 200 typically includes one or more modules stored in the memory device 250, which facilitate such resolution of item-processing exceptions. As depicted in FIG. 2, the system 200 typically may include an exception resolution module 255 configured to process and resolve item-processing exceptions. In order to process the item-processing exceptions, the system 200 typically creates a pipeline context for each received item-processing exceptions. These pipeline contexts may be stored in a pipeline database 260. In addition, the pipeline contexts are typically added to a pipeline queue 265 from which the pipeline contexts may be selected for processing.

Figure 3:
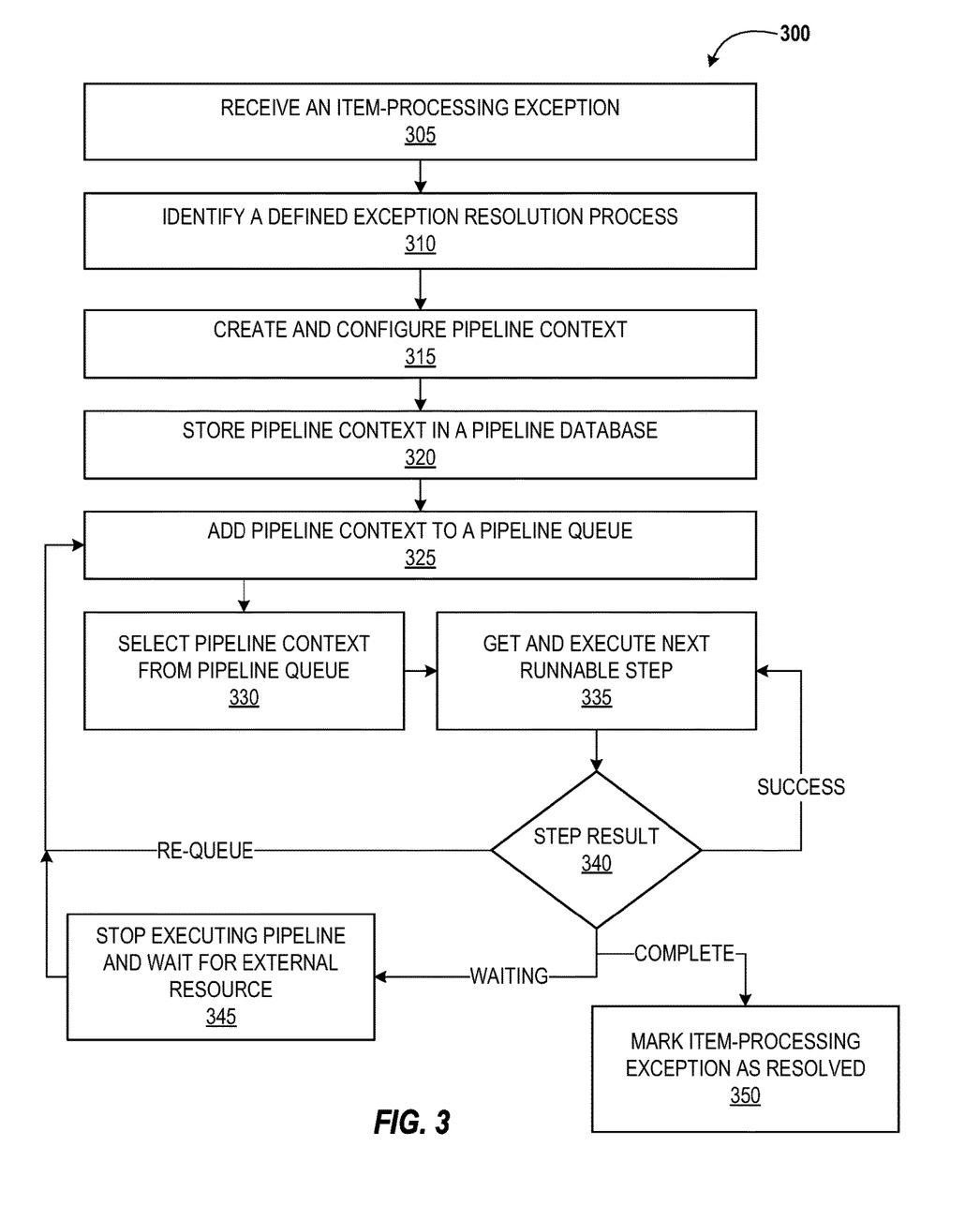
FIG. 3 depicts a method resolving item-processing exceptions in accordance with an aspect of the present invention.

Referring now to FIG. 3, a method 300 is provided for resolving item-processing exceptions. This method 300 may be performed by the system 200.

At block 305, the method 300 includes receiving (e.g., by the system 200) an item-processing exception. The item-processing exception is typically received from an item processing system (e.g., the third party item processing system 140 or the entity item processing system 150). The item processing system may be a transaction processing system. In a typical embodiment, the item processing system is a check processing system that processes physical checks and/or images of physical checks.

The item-processing exception may relate to any problem, abnormality, discrepancy, or the like detected by the item processing system. The item-processing exception, may be an image-processing exception. For example, if the item processing system is a check processing system, the item-processing exception may be a check-image-processing exception that relates to a problem in reading information from a physical check or an image of a physical check (e.g., an error in performing optical character recognition (OCR)). The item-processing exception may relate to a discrepancy between information read from a physical check (or an image of a physical check) and other information provided by a customer to the check processing system (e.g., the amount written on a check may differ from the amount specified by a customer on a deposit slip). By way of further example, the item-processing exception may relate to a check being credited or debited multiple times or a check being credited to and/or debited from an incorrect account.

At block 310, the system 200 typically identifies an exception resolution process. An "exception resolution process" is a series of steps that may be performed by the system 200 in order to resolve the item-processing exception. These steps may relate to different aspects of resolving an item-processing exception. Some steps may relate to collecting additional information about the exception (e.g., additional information about a transaction related to the exception. In addition, some steps may relate to prompting a user (e.g., an entity employee) to manually perform one or more actions. For example, if the item-processing exception cannot be automatically resolved by the system 200, the system 200 may prompt a user to manually resolve the item-processing exception.

Typically, the exception resolution process that should be employed to resolve a particular item-processing exception depends upon the characteristics of the item-processing exception. For example, the system 200 typically identifies the exception resolution process based on the source and/or type of the item-processing exception. The "source" of the item-processing exception refers to the particular item processing system or type of item processing system that generated the item-processing exception. For example, the process for resolving an exception generated by a particular third party item processing system may differ from the process for resolving an exception generated by a particular item processing system operated by the entity. By way of further example, the process for resolving an exception generated by an item processing system that processes retail-customer transactions may differ from the process for resolving an exception generated by an item processing system that processes commercial-customer transactions. Moreover, a particular exception resolution process may be defined for an item-processing system that is configured to resolve customer complaints. Different types of item-processing exceptions may include: (i) exceptions related to processing checks, (ii) exceptions related to processing electronic payments, (iii) exceptions related to deposit correction notices (e.g., a notice received from a third party indicating that there is an error associated with a deposit), and (iv) exceptions related to a request for information (e.g., a request to have a check re-imaged).

By way of example, Table 1 (below) includes steps included in an exemplary exception resolution process for resolving a check-processing exception generated by a third party check processing system.

TABLE 1

| Step | Description |
|---|---|
| 1 | Collects metadata about the check maker (e.g., who wrote the check) |
| 2 | Collects metadata about the check depositor |
| 3 | Determines if the exception involves accounts that can only be serviced by US-resident entity employees |
| 4 | Automatically adjusts the customer or transfers financial responsibility for the exception to the system 200 |
| 5 | Moves the exception onto an analyst worklist to be manually adjusted |
| 6 | Puts the pipeline into a dormant state, waiting for an analyst to manually adjust the customer |
| 7 | Validates that we received adequate depositor metadata |
| 8 | Determines if the exception came via a wholesale lockbox deposit |
| 9 | Searches for possible offsets for the exception; if any found, route the exception to analysts for manual intervention |
| 10 | Sends the exception to analyst worklist for manual resolution |

By way of further example, Table 2 (below) includes steps included in an exemplary exception resolution process for resolving a check-processing exception generated by an entity check processing system that processes commercial customer transactions.

TABLE 2

| Step | Description |
|---|---|
| 1 | Collects metadata about the check maker (e.g., who wrote the check) |

TABLE 2-continued

| Step | Description |
|---|---|
| 2 | Collects metadata about the check depositor |
| 3 | Determines if the exception involves accounts that can only be serviced by US-resident entity employees |
| 4 | Sends the exception to analyst worklist for manual resolution |

The system 200 typically identifies the source, type, and/or other characteristics of the item-processing exception from information included with the item-processing exception. For example, the item-processing exception may include a data field identifying the particular item processing system that generated the item-processing exception. Once the source, type, and/or other characteristics of the item-processing exception have been identified by the system 200, the system 200 typically compares these characteristics (e.g., the source and/or type of the exception) to a database of defined exception resolution processes. Each exception resolution process in such database typically defines a series of steps for resolving an item-processing exception having certain characteristics (e.g., source and/or type). Based on comparing the characteristics of the item-processing exception to the database of defined exception resolution processes, the system is typically able to identify a particular defined exception resolution process whose characteristics match the characteristics of the item-processing exception (e.g., the identified exception resolution process relates to resolving exceptions generated by the source of the item-processing exception). This particular defined exception resolution process is then selected by the system 200 as the exception resolution process for resolving the item-processing exception.

At block 315, the system 200 typically creates and configures a pipeline context for the item-processing exception. A "pipeline context" is a data structure that includes information used to resolve an item-processing exception. In this regard, the system 200 typically configures the pipeline context so that the pipeline context includes the identified exception resolution process (e.g., by encapsulating the steps of the identified exception resolution process within the pipeline context). In addition, the system 200 typically configures the pipeline context so that the pipeline context includes data (e.g., the source, type and/or other characteristics of the item-processing exception) contained in the item-processing exception (e.g., by encapsulating such data within the pipeline context). Other data that may be encapsulated within the pipeline context includes a unique identifier associated with the item-processing exception, a unique identifier of a transaction associated with the item-processing exception, transaction information (e.g., payor, payee, transaction amount, transaction location, and/or the like) related to a transaction that resulted in the item-processing exception, a copy of a check image related to the item-processing exception, and/or the like.

At block 320, the pipeline context is stored (e.g., by the system 200) in a pipeline database (e.g., the pipeline database 260). The pipeline database is typically a database (e.g., a table) that contains pipeline contexts related to different item-processing exceptions received by the system 200.

At block 325, the system 200 typically adds the pipeline context (e.g., a copy of the pipeline context or a pointer to the pipeline context stored in the pipeline database) to a pipeline queue (e.g., the pipeline queue 265).

At block 330, the system 200 selects the pipeline context from the pipeline queue for execution. In this regard, the system 200 typically includes a pipeline manager service that is configured to pipeline contexts from the pipeline queue as resources of the system 200 become available to process such pipeline contexts. In this regard, the system 200 typically includes a thread pool of worker threads. Each worker thread may be used to execute a single pipeline context; however, by having multiple worker threads, the system 200 can execute multiple pipeline contexts in parallel. Once a particular worker thread stops executing a particular pipeline context (e.g., by resolving the associated item-processing or re-queuing the particular pipeline context), the pipeline manager service typically assigns another pipeline context from the pipeline queue to such worker thread for execution. The pipeline manager service may employ various rules or principles for selecting pipeline contexts from the pipeline queue for execution. For example, the pipeline manager service may select pipeline contexts from the pipeline queue based on first in first out (FIFO), last in first out (LIFO), expected processing time (e.g., pipeline contexts with shorted expected processing times may be selected over pipeline contexts with longer expected processing times), priority (e.g., certain pipeline contexts may be prioritized based on the characteristics of the associated item-processing exception), and/or other rules or principles for selecting items from a queue. Once the pipeline context is selected from the pipeline queue, the pipeline context is typically assigned to an available worker thread from the thread pool.

Once the pipeline context has been assigned to an available worker thread by the pipeline manager service, the worker thread begins execution of the pipeline context. As noted, the pipeline context typically includes the steps of the identified exception resolution process. Accordingly, at block 335, the worker threads gets and then executes the next runnable step of the identified exception resolution process. As noted above, a step may relate to collecting (e.g., from a third party system or another entity system) additional information related to the item-processing exception. Once such information is collected, the information may be encapsulated within the pipeline context. In addition, a step may relate to prompting a user to manually perform one or more actions. Accordingly, the system 200 may transmit a command to a user device (e.g., user computing device 120) that causes the user device to display an interface configured to display information about the item-processing exception and receive information from the user related to the item-processing exception. Because the system 200 may be able to cause the user device to display such information, the user may be more quickly made aware of the actions requested by the system, thereby reducing processing delays in the system's resolution of the item-processing exception.

At block 340, the worker thread determines the result of executing such step. If such step has been successfully completed, then the method 300 returns to block 335, where the worker threads gets and then executes the next runnable step of the identified exception resolution process.

In some instances, at block 340, the worker thread may determine that the pipeline context should be re-queued. For example, the worker thread may determine that the step has not been completed (e.g., due to system latency), and so the worker thread may decide to re-queue the pipeline context. As such, the method 300 then returns to block 325. Thereafter, the pipeline context may be re-selected by the pipeline manager service and then executed by another worker thread. This worker thread may then determine that the step has been completed and execute a next step of the exception resolution process.

In some instances, at block 340, the worker thread may determine that the pipeline context is waiting on a response from an external resource in order to complete the step. For example, the worker thread may be waiting on an external system (e.g., a system other than the system 200) or a user to provide information needed to complete the step. Accordingly, at block 345, in response to determined that the step is waiting on the response from the external resource in order for the step to be completed, the system 200 may stop execution of the pipeline context and wait for the response from the external resource. Once the response from the external resource has been received, the system 200 may either (i) re-queue the pipe context, thereby returning the method 300 to block 325, or (ii) resume execution of the pipeline context, thereby returning the method 300 to block 335.

In some instances, at block 340, the worker thread may determine that the exception resolution process has been completed, such as by determining that the item-processing exception has been resolved. For example, the worker thread may determine that the item-processing exception has been resolved as a result of successfully completing the last step of the exception resolution process. Alternatively, the results of an intermediate step of the exception resolution process may indicate that item-processing exception has been resolved. For example, if the item-processing exception relates to a discrepancy of a transaction amount, an intermediate step may relate to determining an amount of the discrepancy. If the amount of the discrepancy is below a defined threshold, the system 200 may mark the item-processing exception as resolved and write-off the amount of the discrepancy, rather than expending further resources to execute remaining steps of the exception resolution process. Once the worker thread determines that the item-processing exception has been resolved, at block 350, the system 200 marks the item-processing exception. In addition, the system 200 may transmit a message to the item processing system that generated the item-processing exception. The message may indicate that the item-processing exception has been resolved.

In some embodiments, at block 340, the worker thread may determine that the exception resolution process has been completed, but that the item-processing exception has not been resolved. For example, completing the last step of the exception resolution process might not result in the resolution of the item-processing exception. Typically, if the worker thread determines that the exception resolution process has been completed but that the item-processing exception has not been resolved, then the system prompts a user to manually resolve the item-processing exception (e.g., by transmitting a command to a user device that causes the device to display an interface related to the item-processing exception).

This method 300 may be repeated for any other item-processing exception received from the item processing system or any other item processing system(s).

In some embodiments, the system 200 may be configured to create, configure, and execute pipeline contexts having a parent-child relationship. For example, the system 200 may receive a group of related item-processing exceptions. For example, the item-processing exceptions may all relate to the same transaction (e.g., were generated during the processing of the transaction by a transaction processing system). A pipeline context would be created (e.g., by the system 200) for each item-processing exception as described in more detail above. The pipeline contexts for the related item-processing exceptions would be considered "child"

pipeline contexts. The system 200 would also create a "parent" pipeline context. The "parent" pipeline context typically includes (e.g., is encapsulated with) execution steps related to the group of related item-processing exceptions. For example, the "parent" pipeline context may include a step that initiates execution of the "child" pipeline contexts. The parent" pipeline context may include a step that alerts an entity employee if any of the "child" pipeline contexts experience errors. The parent" pipeline context may include a step that marks the group of related item-processing exceptions as being resolved once execution of all "child" pipeline contexts has been successfully completed.

As evident from the preceding description, the system described herein represents an improvement in technology by resolving item-processing exceptions. In particular, the system provides a technical solution for resolving exceptions (e.g., errors) generated by item processing systems. In addition, by creating a pipeline context for each item-processing exception, steps and data related to the item-processing exception may be stored in a single location, thereby reducing demands on system resources (e.g., by reducing memory and/or processing requirements) used to resolve each item-processing exception. Furthermore, by utilizing a pool of worker threads to execute the pipeline contexts, the system 200 is able to resolve multiple item-processing exceptions in parallel and increase performance of the system 200. Encapsulating the steps for resolving each item-processing exception in a pipeline context has the added advantage of allowing the system to efficiently execute different exception resolution processes in parallel, which, as noted herein, may vary depending on the characteristics of the item-processing exceptions.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for resolving item-processing exceptions, comprising:
   a hardware processing device;
   a non-transitory physical memory; and
   an exception resolution module stored in the memory, executable by the processing device and configured for:
      receiving an item-processing exception, wherein the item-processing exception is a check-image-processing exception concerning an image of a paper check;
      determining a source of the item-processing exception;
      based on the source of the item-processing exception, identifying a defined exception resolution process from a first database of defined exception resolution processes;
      based on the defined exception resolution process, creating and configuring a data structure for resolving the item-processing exception, the data structure comprising encapsulated steps of the exception resolution process;
      collecting data related to the item-processing exception and encapsulating the collected data in the data structure;
      storing the data structure in a second database;
      adding the data structure to a queue;
      selecting, via a manager service, the data structure from the queue based on first in first out (FIFO), last in first out (LIFO), expected processing time, or priority;
      assigning, via the manager service, the data structure to an available worker thread from a thread pool that comprises a plurality of worker threads, wherein the plurality of worker threads are configured to execute a plurality of exception resolution processes in parallel; and
      executing, via the available worker thread, the encapsulated steps of the exception resolution process in the data structure.

2. The system according to claim 1, wherein the exception resolution module is further configured for determining a type of the item-processing exception, wherein the defined exception resolution process is identified based also on the type of the item-processing exception.

3. The system according to claim 1, wherein creating the data structure comprises encapsulating within the data structure (i) steps of the defined exception resolution process and (ii) data contained in the item-processing exception.

4. The system according to claim 1, wherein executing the data structure comprises collecting data related to the item-processing exception and encapsulating the collected data in the data structure.

5. The system according to claim 1, wherein the exception resolution module is further configured for:
   during execution of the data structure, determining, via the available worker thread, that a step of the defined exception resolution process has not been completed; and
   in response to determining that the step has not been completed, re-inserting the data structure by adding the data structure to the queue.

6. The system according to claim 5, wherein the exception resolution module is further configured for:
   after re-inserting the data structure, re-selecting, via the manager service, the data structure from the queue; and
   executing, via a second worker thread, the data structure by: (i) determining that the step has been successfully completed, and (ii), in response to determining that the step has been successfully completed, executing a next step of the defined exception resolution process.

7. The system according to claim 1, wherein the exception resolution module is further configured for:
   during execution of the data structure, determining, via the available worker thread, that a step of the defined exception resolution process is waiting on a response from an external resource;
   in response to determining that the step is waiting on the response from the external resource, stopping execution of the data structure;
   receiving the response from the external resource; and
   in response to receiving the response from the external resource, (i) re-inserting the data structure by adding the data structure to the queue or (ii) resuming execution of the data structure by the available worker thread.

8. A computer program product for resolving item-processing exceptions, comprising a non-transitory computer-readable storage medium having computer-executable instructions for:
   receiving an item-processing exception, wherein the item-processing exception is a check-image-processing exception concerning an image of a paper check;
   determining a source of the item-processing exception;
   based on the source of the item-processing exception, identifying a defined exception resolution process from a first database of defined exception resolution processes;
   based on the defined exception resolution process, creating and configuring a data structure for resolving the item-processing exception, the data structure comprising encapsulated steps of the exception resolution process;
   collecting data related to the item-processing exception and encapsulating the collected data in the data structure;
   storing the data structure in a second database;
   adding the data structure to a queue;
   selecting, via a manager service, the data structure from the queue based on first in first out (FIFO), last in first out (LIFO), expected processing time, or priority;

assigning, via the manager service, the data structure to an available worker thread from a thread pool that comprises a plurality of worker threads, wherein the plurality of worker threads are configured to execute a plurality of exception resolution processes in parallel; and executing, via the available worker thread, the encapsulated steps of the exception resolution process in the data structure.

9. The computer program product according to claim 8, wherein the non-transitory computer-readable storage medium has computer-executable instructions for determining a type of the item-processing exception, wherein the defined exception resolution process is identified based also on the type of the item-processing exception.

10. The computer program product according to claim 8, wherein creating the data structure comprises encapsulating within the data structure (i) steps of the defined exception resolution process and (ii) data contained in the item-processing exception.

11. The computer program product according to claim 8, wherein executing the data structure comprises collecting data related to the item-processing exception and encapsulating the collected data in the data structure.

12. The computer program product according to claim 8, wherein the non-transitory computer-readable storage medium has computer-executable instructions for:

during execution of the data structure, determining, via the available worker thread, that a step of the defined exception resolution process has not been completed; and in response to determining that the step has not been completed, re-inserting the data structure by adding the data structure to the queue.

13. The computer program product according to claim 12, wherein the non-transitory computer-readable storage medium has computer-executable instructions for:

after re-inserting the data structure, re-selecting, via the manager service, the data structure from the queue; and executing, via a second worker thread, the data structure by: (i) determining that the step has been successfully completed, and (ii), in response to determining that the step has been successfully completed, executing a next step of the defined exception resolution process.

14. The computer program product according to claim 8, wherein the non-transitory computer-readable storage medium has computer-executable instructions for:

during execution of the data structure, determining, via the available worker thread, that a step of the defined exception resolution process is waiting on a response from an external resource;

in response to determining that the step is waiting on the response from the external resource, stopping execution of the data structure;

receiving the response from the external resource; and in response to receiving the response from the external resource, (i) re-inserting the data structure by adding the data structure to the queue or (ii) resuming execution of the data structure by the available worker thread.

15. A computerized method for resolving item-processing exceptions, comprising:

receiving an item-processing exception, wherein the item-processing exception is a check-image-processing exception concerning an image of a paper check;

determining a source of the item-processing exception;

based on the source of the item-processing exception, identifying a defined exception resolution process from a first database of defined exception resolution processes;

based on the defined exception resolution process, creating and configuring a data structure for resolving the item-processing exception, the data structure comprising encapsulated steps of the exception resolution process;

collecting data related to the item-processing exception and encapsulating the collected data in the data structure;

storing the data structure in a second database;

adding the data structure to a queue;

selecting, via a manager service, the data structure from the queue based on first in first out (FIFO), last in first out (LIFO), expected processing time, or priority;

assigning, via the manager service, the data structure to an available worker thread from a thread pool that comprises a plurality of worker threads, wherein the plurality of worker threads are configured to execute a plurality of exception resolution processes in parallel; and executing, via the available worker thread, the encapsulated steps of the exception resolution process in the data structure.

* * * * *